United States Patent
Liu

(10) Patent No.: US 9,896,854 B2
(45) Date of Patent: Feb. 20, 2018

(54) POOL APPARATUS

(71) Applicant: Bestway Inflatables & Material Corp., Shanghai (CN)

(72) Inventor: Feng Liu, Shanghai (CN)

(73) Assignee: Bestway Inflatables & Material Corp., Shanghai (CN)

( * ) Notice: Subject to any disclaimer, the term of this patent is extended or adjusted under 35 U.S.C. 154(b) by 0 days.

(21) Appl. No.: 15/153,174

(22) Filed: May 12, 2016

(65) Prior Publication Data
US 2017/0101794 A1    Apr. 13, 2017

(30) Foreign Application Priority Data

Oct. 10, 2015 (CN) .......................... 2015 1 0652485
Oct. 10, 2015 (CN) .................... 2015 2 0784533 U

(51) Int. Cl.
*E04H 4/00* (2006.01)
*E04H 4/12* (2006.01)
*F16L 5/00* (2006.01)

(52) U.S. Cl.
CPC .......... *E04H 4/1218* (2013.01); *E04H 4/1245* (2013.01); *F16L 5/00* (2013.01)

(58) Field of Classification Search
CPC .................................................. E04H 4/1209
USPC ............................................ 4/488, 507–512
See application file for complete search history.

(56) References Cited

U.S. PATENT DOCUMENTS

| | | | |
|---|---|---|---|
| 3,932,281 A | 1/1976 | Pansini | |
| 4,503,573 A * | 3/1985 | Handzel | E04H 4/1209 4/490 |
| 4,658,449 A | 4/1987 | Martin | |
| 4,686,718 A * | 8/1987 | Kinkead | E04H 4/1209 137/428 |
| 5,577,274 A * | 11/1996 | Plotsky | E04H 4/12 137/539 |
| 5,785,846 A * | 7/1998 | Barnes | E04H 4/1272 210/167.12 |
| 5,809,587 A | 9/1998 | Fleischer | |
| 6,022,481 A * | 2/2000 | Blake | E04H 4/1272 15/1.7 |
| 7,140,051 B2 | 11/2006 | Fort et al. | |
| 8,555,989 B1 | 10/2013 | Agajanian | |
| 8,650,673 B1 * | 2/2014 | Goettl | E04H 4/1236 4/507 |

(Continued)

FOREIGN PATENT DOCUMENTS

AU    2016259852 A1    11/2016
CA    2955104 A1    1/2017

(Continued)

*Primary Examiner* — Lori Baker
(74) *Attorney, Agent, or Firm* — McDermott Will & Emery LLP

(57) ABSTRACT

A pool apparatus includes a pool body, a water inlet, a water outlet, and an outlet valve. The water inlet is used for carrying water into the pool body. The water outlet is used for draining water out of the pool body. The outlet valve covers the water outlet. The outlet valve has a drainage surface for draining water out of the pool body from the drainage surface with a drainage direction. The outlet valve has a protrusion block protruding with a distance opposite to the drainage direction from the drainage surface to decrease the risk that the user may be sucked on the outlet valve.

20 Claims, 12 Drawing Sheets

(56) References Cited

U.S. PATENT DOCUMENTS

| | | |
|---|---|---|
| 9,254,240 B2 | 2/2016 | Lin et al. |
| 9,468,582 B2 | 10/2016 | Lin et al. |
| 9,468,583 B2 | 10/2016 | Lin et al. |
| 9,567,762 B2 | 2/2017 | Lin et al. |
| 9,642,771 B2 | 5/2017 | Lin et al. |
| 2006/0230514 A1 | 10/2006 | Meincke |
| 2010/0050335 A1 | 3/2010 | Baker |
| 2010/0187169 A1 | 7/2010 | Hilton et al. |
| 2015/0020306 A1 | 1/2015 | Lin et al. |
| 2015/0135424 A1 | 5/2015 | Lin et al. |
| 2016/0128900 A1 | 5/2016 | Lin et al. |
| 2016/0136043 A1 | 5/2016 | Lin et al. |
| 2017/0027815 A1 | 2/2017 | Lin et al. |

FOREIGN PATENT DOCUMENTS

| | | |
|---|---|---|
| CN | 201505471 | 6/2010 |
| CN | 202289680 | 7/2012 |
| CN | 202708091 | 1/2013 |
| CN | 202708233 | 1/2013 |
| CN | 203583943 | 5/2014 |
| CN | 203627900 | 6/2014 |
| CN | 203628111 | 6/2014 |
| CN | 203640334 | 6/2014 |
| CN | 203654813 | 6/2014 |
| CN | 204139662 | 2/2015 |
| CN | 204141859 | 2/2015 |
| CN | 204326598 | 5/2015 |
| CN | 204328168 | 5/2015 |
| CN | 204910936 | 12/2015 |
| CN | 205000681 | 1/2016 |
| CN | 205296923 | 6/2016 |
| CN | 205558379 | 9/2016 |
| CN | 205591600 | 9/2016 |
| CN | 205678173 | 11/2016 |
| CN | 106567564 | 4/2017 |
| EP | 2752527 A1 | 7/2014 |
| EP | 3021721 A2 | 5/2016 |
| EP | 3153643 A1 | 4/2017 |
| WO | 15010058 A2 | 1/2015 |
| WO | 15085227 A1 | 6/2015 |
| WO | 16181209 A1 | 11/2016 |

* cited by examiner

POOL APPARATUS

FIELD OF INVENTION

The present invention is related to a pool apparatus, and more particularly related to a pool apparatus for water outflow and inflow.

BACKGROUND

Pools have a rather long history. There are various types of pools designed for different purposes such as for swimming or for spa. Some pools are made through fixed structure, such as digging a hole on the ground and making strengthened water-resistant surface. Some pools are installed temporarily. For example, large water-resistant plastic clothing may be accompanied with a supporting structure to form an accommodation structure of a pool.

While a pool is used for a period of time, floater in the air or other pollutants may fall into the pool, or users may make the pool water turbid. If there is no proper dealing with the pool water, it may cause stinky smell or even cause unnecessary harm to human bodies.

To ensure and maintain water quality in the pool, there are various methods. For example, all water in a pool may be discharged, and then new water is filled into the pool. Another way is periodically or constantly channeling the water to a filter mechanism. After the water is filtered, the filtered water is channeled back to the pool.

For human use pools, in addition to considering the comfort and convenience of usage, the safety of usage must be taken into account as well.

SUMMARY OF INVENTION

To ensure safety of pools, it is noted by the inventor that there is certain sucking force at the outlets of pools. Such sucking force may suck human body, and further leave human body or their clothes sucked on the draining outlets, which may cause sucked body parts to become red and swollen, and even may cause unfortunate drowning accident.

To avoid these problems, there are several embodiments of pool apparatuses provided in the present invention. For instance, a practical embodiment based on the invention is a pool apparatus containing a pool body, a water inlet, a water outlet, and an outlet valve. The pool body is used to hold water for users to do activities in the pool body. For example, the pool body may allow one or many users to swim, play, or do spa in the pool.

The water inlet is used to deliver water to the pool body. The water outlet is used to drain the pool water out of the pool body. The outlet valve covers the water outlet. The outlet valve has a drainage surface to drain water via the drainage surface out of the pool body with a draining direction. The outlet valve has a protrusion block that protrudes with a protruding distance opposite to the draining direction with respect to the drainage surface to reduce the risk of users being sucked at the outlet valve.

Please be noted that there may be various designs based on the inventive idea. For example, the outlet valve has a main body portion to form the drainage surface. The protrusion block is set on the main body portion. The bottom portion of the protrusion block overlaps partially with the drainage surface. The main body portion includes at least a filter screen for draining water from the pool body. In addition, the protrusion block has a protrusion portion, extending with a protrusion distance from the drainage surface.

The main body portion may include a circular structure. The protrusive distance of the protrusive portion corresponds with the diameter of the circular structure. It may be set over 5%, 10%, 20%, or others based on different pool sizes, functions of usage, or draining force.

The circular structure may have a side surrounding part and a circular face, which are equipped with the filter structure to drain water out of the pool body.

In addition, the protrusion portion of the protrusion block may include a top-surfaced filter to drain water out of the pool body.

The protrusion block and the main body may be designed as an integral form or two separable structures. With the latter design, the main body may have a thorough hole to assemble the protrusion block.

The protrusion block may have various shapes. For example, the protrusion portion of the protrusion block may be a dome structure or a cone structure.

In addition, the protrusion portion of the protrusion block may also be designed as including a supportive blocking frame. This supportive blocking frame may form a separating space, which separates a user from the drainage surface to keep the predetermined distance, and keeps the water flowing through the separating space and entering the drainage surface.

The protrusion portion of the protrusion block is not limited to one. It may have two or more than two protrusion portions.

In addition, in some designs, the bottom area of the protrusion block is smaller than that of the drainage surface. In fact, the bottom area of the protrusion block may be larger than the size of the drainage surface. For example, with the structural design, water may be drained out of the pool body through a lateral filter.

The main body portion of the outlet valve may be a polygonal structure. In addition, the main body portion of the outlet valve and the protrusion block may have the same or different geometrical shapes.

The pool apparatus may contain a filter pump linked to the water inlet and the water outlet of the pool body pool for offering a draining power to drain water out of the pool body from the water outlet. The protrusive distance and the draining power have a predetermined correspondence. For example, the stronger the draining power of the filter pump gets, the larger numerical value the protrusive distance may be made. Alternatively, the size of the drainage surface may be enlarged to decrease the risk of the user getting stuck in the water outlet.

For example, a pool for people to use may have draining power over 1000 gallons/hour, or over 2000 gallons/hour.

In addition, the pool apparatus further contains an emergency switch to switch off the filter pump used for drainage, or the water outlet. This emergency switch can be set at the location which is within the reach of the user's hands when the user is stuck in the drainage valve.

DETAILED DESCRIPTION

Figure 1A:
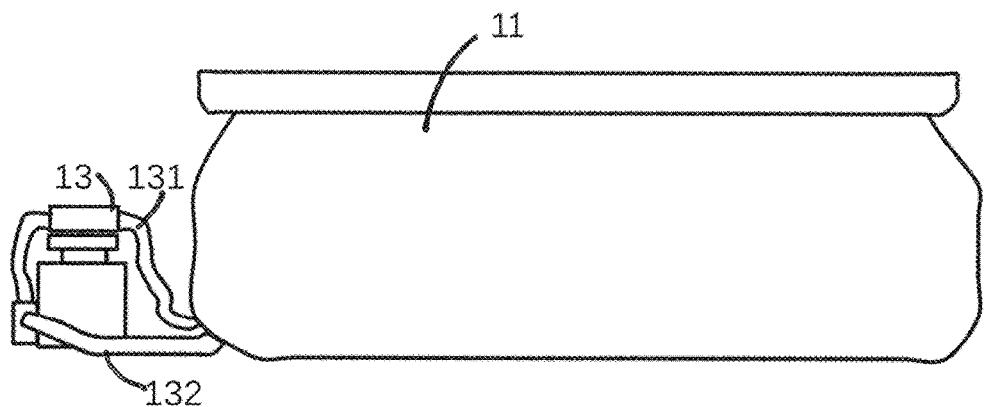
FIG. 1A is an embodiment of a pool apparatus according to the present invention.

Please refer to FIG. 1, which illustrates an embodiment of a pool apparatus according to the present invention. The pool apparatus contains a pool body 11 used to load water. Based on different design needs, it allows one or many users to doing different activities such as bathing, swimming, playing, etc. To maintain the cleanliness of water quality, there is a filter pump 13, which drains the water out of the pool 11 through the outlet pipe 132. The filter pump 13 filters the water via filtering mechanism inside it, and then delivers the water into the pool body 11 through the inlet pipe 131.

Figure 1B:
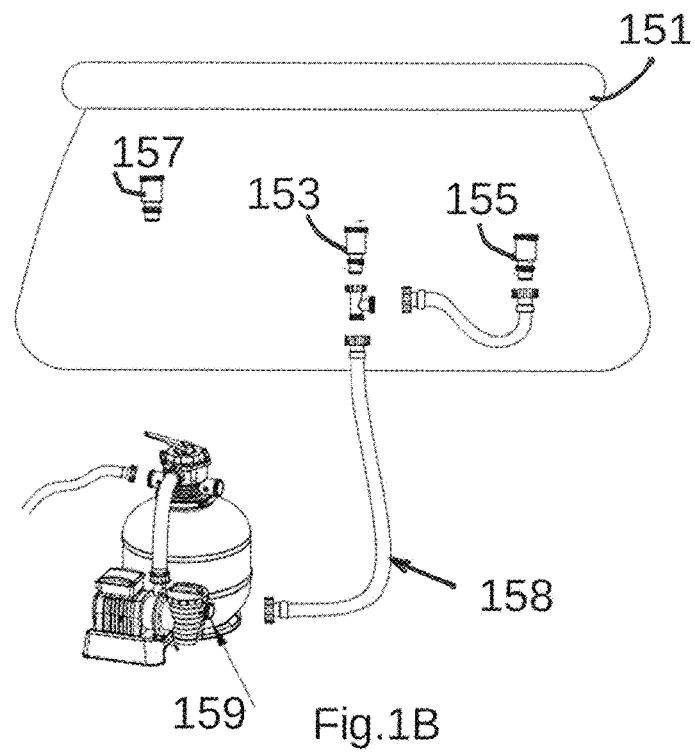
FIG. 1B is an embodiment of a pool apparatus according to the present invention.

Please refer to FIG. 1B, which illustrates an embodiment of a pool apparatus. The pool has the pool body 151. The filter pump 159 is used for filtering and cleaning the water in the pool. In this example, the pool has two outlet valves 153, and 155. Parts of structures of the two outlet valves 153, 155 are set inside the pool body 151, and the others are set outside the pool body 151. They are assembled through the preset holes. In addition, the two outlet valves 153, 155 are linked to the filter pump 159 with a 1-to-2 connector through the pipe 158. In addition, the filter pump 159 pushes the filtered water into the pool body 151 through the inlet valve 157 to keep the water cycle complete.

Figure 1C:
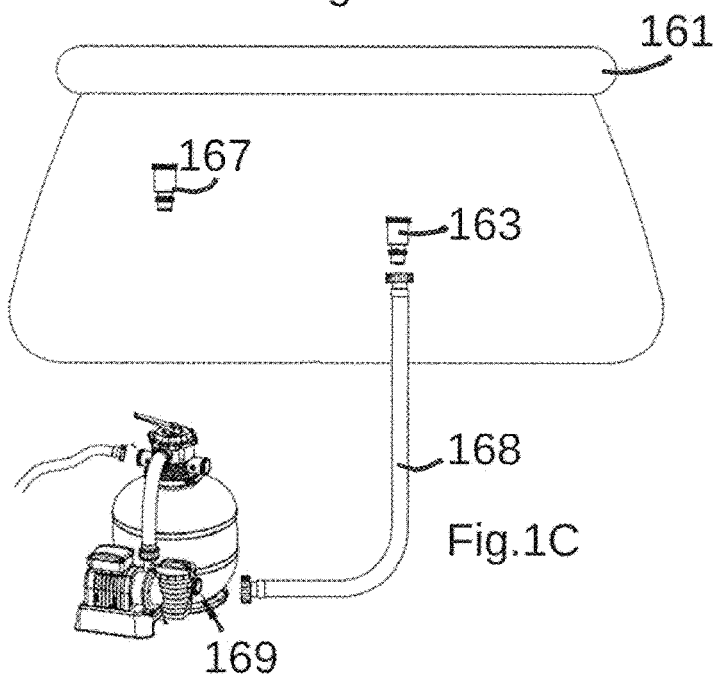
FIG. 1C is another embodiment of a pool apparatus according to the present invention.

Please refer to FIG. 1C, which illustrates an embodiment of a pool apparatus. The pool has the pool body 161. The filter pump 169 is used for filtering and cleaning the pool water. Different from the above-mentioned example, this pool has only one outlet valve 163. However, what is worth mentioning is that the pool may have more outlet valves or inlet valves under other design needs. One part of the structure of the outlet valve 163 is set in the pool body 161. Another part is set outside the pool body 161, and is assembled via preset holes. In addition, through one to two connectors, the outlet valve 163 is linked to the filter pump 169 through the pipeline 168. In addition, through the inlet valve 167, the filter pump 169 pushes the filtered water into the pool body 161 to keep the water cycle complete.

What needs mentioning is that in addition to the embodiments in the illustration, the relative position and layout approach to the filter pump 13 and the pool body 11 may also be in other ways. For example, the filter pump may be embedded in the pool body. In addition, there may be more filter pumps, or more inlet pipes and outlet pipes butted to the pool body. The filter pump may be added with other functions as well such as increasing or decreasing the water temperature. There are several options to activate filtering of the pool. For example, the filter pump may be set statically or alternatively via the intelligent feedback system, or be operated by the user. These various designs should still be considered covered in the invention field.

In addition, the pool apparatus may also not be equipped with the corresponding filter pump. Even so, in the process of draining water, suction might be formed in the drainage outlet, and the suction still may cause some risk to the users. For example, the water amount in the pool is over to some extent, or the ones who use the pool are kids with less strength, the elders, or those who lose most of their muscle strength because of health problems.

Figure 2:
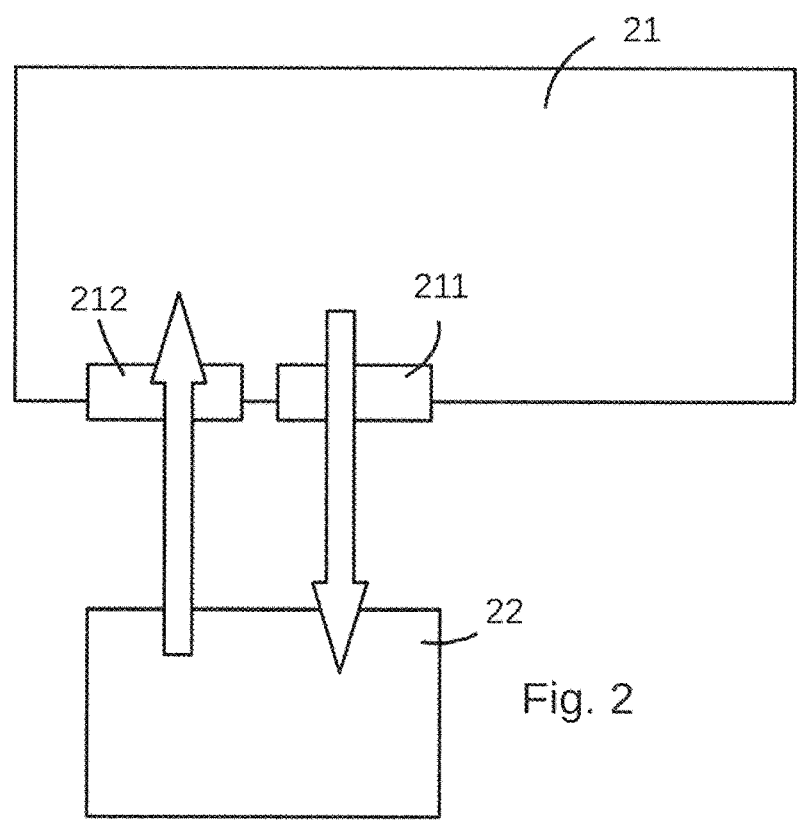
FIG. 2 illustrates the relationship of flow between the water in a pool body pool and a filter pump.

Please refer to FIG. 2, which illustrates the flow relationship between the pool water and the filter pump. The pool body 21 is used to load water for users to do activities. In addition, the filter pump 22, which is linked to the pool body 21, gets water from the water outlet 211 in the pool body, and filters it. Then the filtered water is introduced into the pool body 21 through the water inlet 212. From FIG. 2, it can be known that the place where risks are likely to happen is the position of the water outlet 211 in the pool body pool 21.

Figure 3:
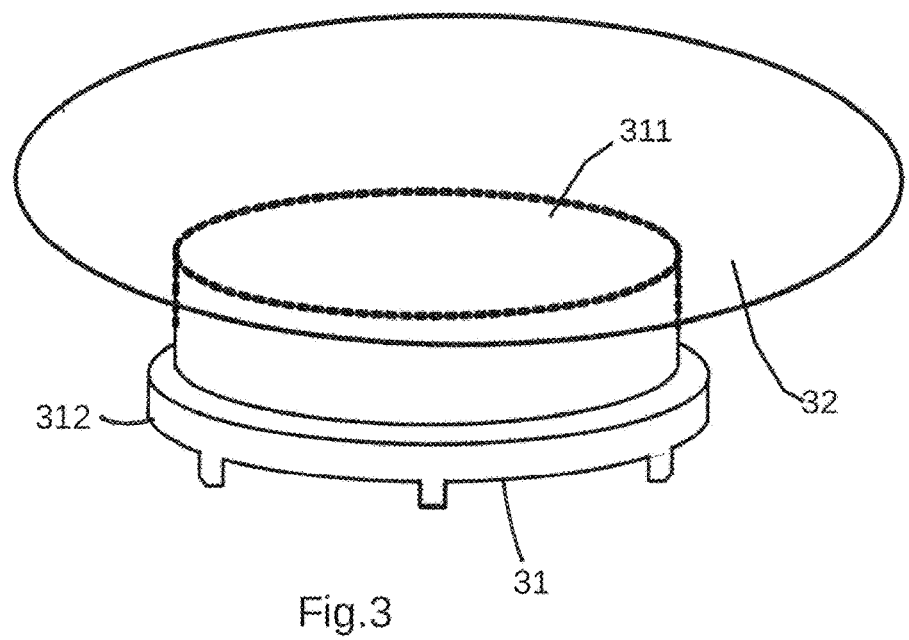
FIG. 3 illustrates how a user is sucked by a water outlet.

Please refer to FIG. 3, which illustrates the reason why the outlet valve set in the pool body may cause risks to users. In this figure, the outlet valve 31 is set covering a water outlet of a pool body. Therefore, the water will flow through the outlet valve 31, and into a filter pump or outside the pool body. This outlet valve 31 may be designed to be equipped with a multi-holed structure to let the water flow through the filter structure of these holes or the filter screen, and then flow into the water outlet.

In the process of doing activities, users' body parts 32, such as hands, feet, other body parts, or clothes, are likely to be close to the outlet valve 31. At this moment, because there is suction caused by the drained water abound the outlet valve 31, the user's body 32 is likely to be pulled by the suction, and stuck at the outlet valve 31. From FIG. 3, it can be known that the user's body 32 is mainly sucked by the surface 311 of the outlet valve 31. Furthermore, the main reason why the user's body 32 is sucked is that the upper surface 311 of the outlet valve 31 is a flat and smooth surface, which makes the contact area of the user's body 32 rather large. Even though the side 312 of the outlet valve 31 is designed to be equipped with the filtering screen or holed structure, a rather amount of suction still occurs to the user's body parts when the upper side 311 of the main draining surface is closely adjacent to the body 32.

Figure 4:
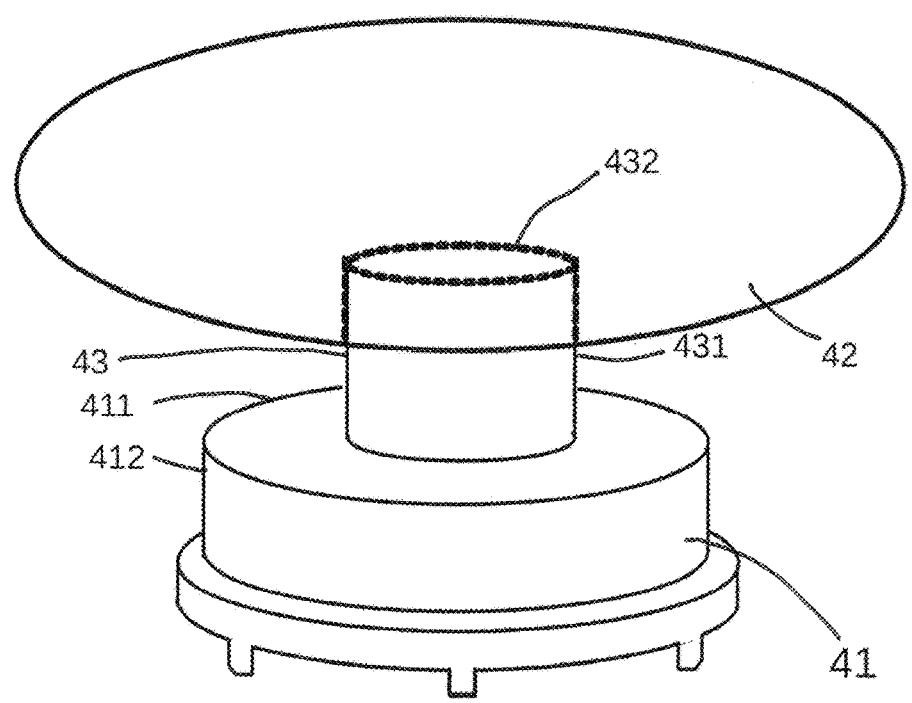
FIG. 4 illustrates an embodiment of an outlet valve.

Please refer to FIGS. 4, 7A-7D and 8A-8E, which is a better embodiment of the outlet valve according to the present invention. In FIG. 4, the outlet valve contains two parts, the main body portion 41 and the protrusion block 43. The main body portion 41 is similar to the outlet valve in FIG. 3, containing the upper surface 411 and the surrounding side 412. The upper surface 411 and the surrounding side 412 may be set holes or the filter screen. In this embodiment, the upper surface 411 is a circular-shaped with a circular draining surface corresponding to the lower covered water outlet. The water flows from the upper surface 411 or the surrounding side 412 into the main body portion 41, and is channeled into the water outlet in the drainage direction.

In this embodiment, the protrusion block 43 has the circular upper surface 432 and the surrounding side 431. The protrusion block 43 protrudes upward a distance from the upper surface 411 of the main body portion 41 corresponding to the drainage surface in opposite to the drainage direction. In this embodiment, the protrusive distance is the height of the surrounding part 431 of the protrusion block 43. In addition, it can be seen from FIG. 4 that the bottom side of the protrusion block 43 overlaps with the drainage surface, which corresponds to the upper surface 411 of the main body portion 41. In this embodiment, the bottom size of the protrusion block 43 is smaller than that of the drainage surface with which the surface 411 of the main body portion 41 corresponds. But the latter embodiment may explain that it can have different arrangements in another design. The upper surface 432 of the protrusion block 43 and the surrounding side 431 can be set with structures such as holes or filter screens.

In FIGS. 4, 7A-7D and 8A-8E, when the user uses it, the body 42 doesn't directly contact the upper surface 411 of the main body portion 41 of the outlet valve. By contrast, the user's body 42 will contact the upper face 432 of the protrusion block 43. Because the user's body 42 is blocked by the protrusion block 43, the user's body 42 will keep a distance from the main body portion 41 rather than directly cover most part of the outlet valve. As long as the water can flow out smoothly, the contact position between the body 42 and the outlet valve 41 does not produce exceeding suction so that the user's risk can be reduced.

In practice, the outlet valve may have different designs, all of which may be used to control the way users' bodies make contact with the outlet valve when they use the pool, and further decrease the risk of usage. Take the following different embodiments to account for the various real possibilities. However, what needs to account for is that besides these embodiments, other transformations based on the same concept should also be considered covered within the invention field.

Figure 5A:
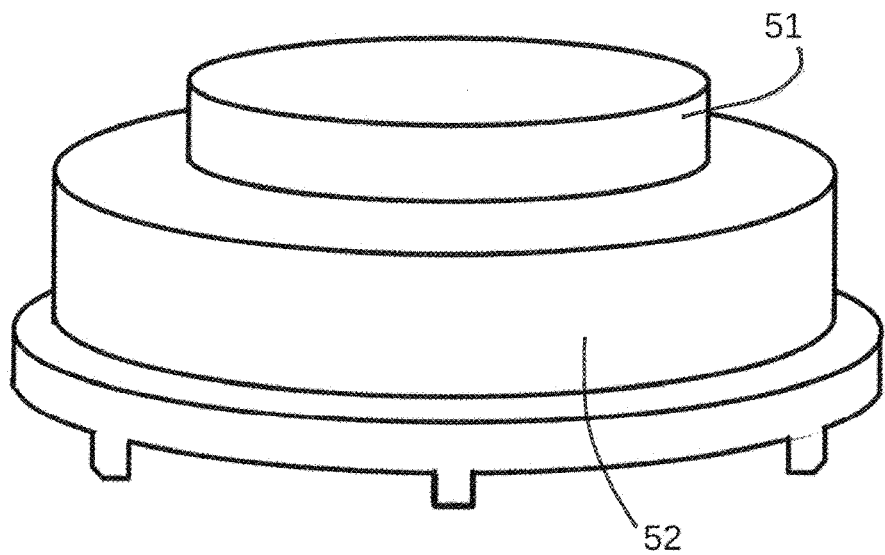
FIG. 5A illustrates an embodiment of the structure of the outlet valve according to the present invention.

Please refer to FIG. 5A, which illustrates the structure of the outlet valve according to the present invention. This outlet valve has a main body portion 52 and a protrusion block 51. As the mentioned above, the protrusion block 51 overlaps with the main body portion 52, and is a protrusive distance higher than the drainage surface of the main body portion 52.

Figure 5B:
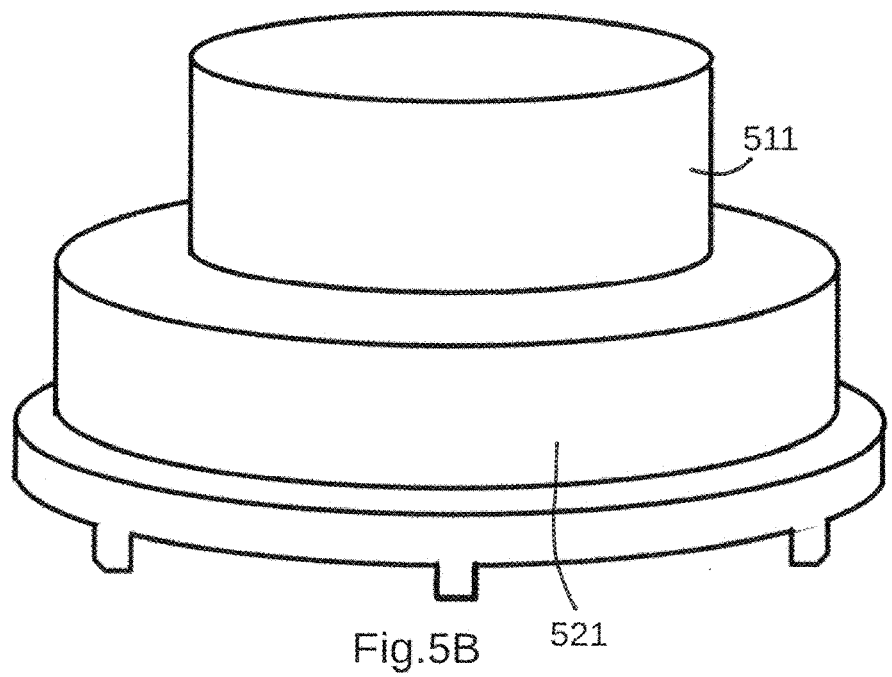
FIG. 5B illustrates another embodiment of the structure of the outlet valve according to the present invention.

Please refer to FIG. 5B, which illustrates another structure of the outlet valve according to the present invention. Compared with FIG. 5A, the protrusion block 511 in the outlet valve of FIG. 5B is higher. Therefore, this design is safer, or capable of corresponding to stronger sucking force. When the protrusive distance of the protrusion block 511 is designed, what is mainly considered if the relationship between its length and the size of the corresponding drainage surface of the body 521. Specifically speaking, the upper side of the main body is circular, and the ratio between the protrusive length and the diameter is over 5%, 10%, or 20%.

The actual controlled parameter may be determined by different drainage forces. For example, the power of the drainage suction can be up to 1000 gallons/hr, or even over 2000 gallons/hr. If the suction force is stronger, the relatively higher protrusive distance is set to ensure the lower risk.

In addition to the circular-plated shape or the cylinder shape of FIGS. 5A and 5B, the main body portion of the outlet valve and the protrusion block may be designed in different ways.

Figure 5C:
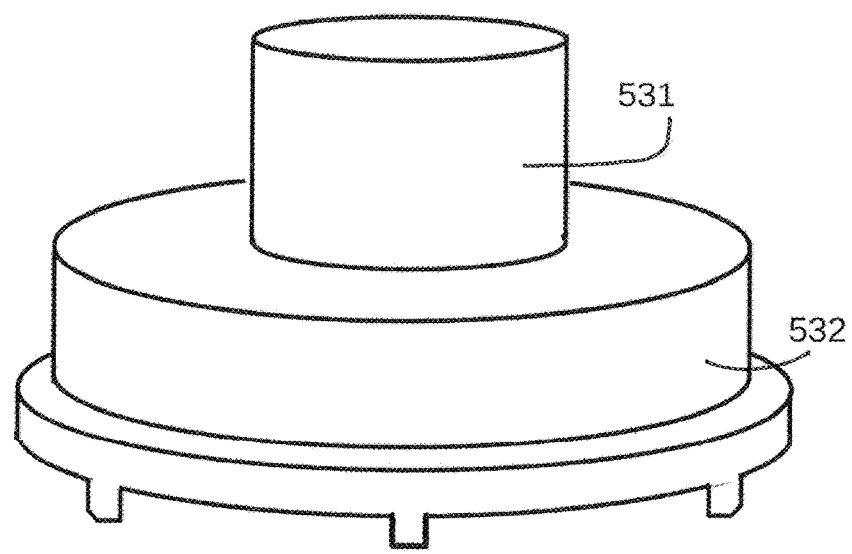
FIG. 5C illustrates another embodiment of the structure of the outlet valve according to the present invention.

Please refer to FIG. 5C, which illustrates another structure of the outlet valve according to the present invention. In this embodiment, the main body portion 532 is still disk-shaped, and the protrusion block 531 is a smaller cylinder with smaller diameter.

Figure 5D:
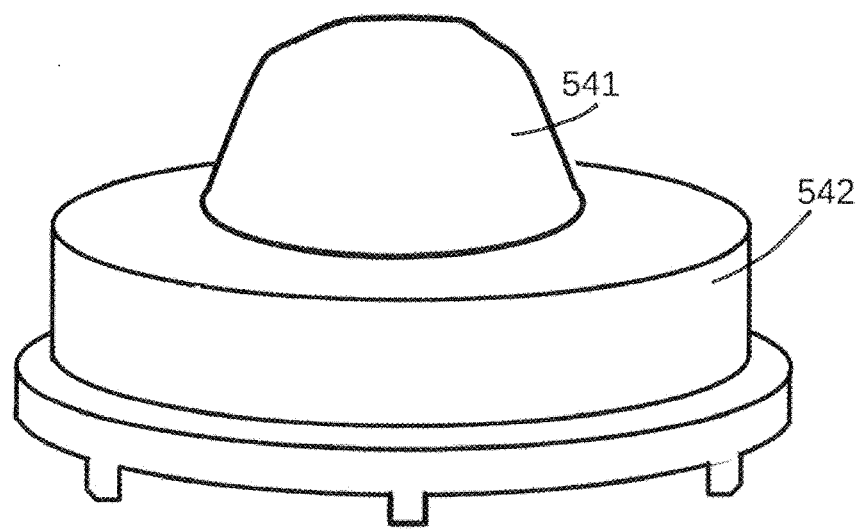
FIG. 5D illustrates another embodiment of the structure of the outlet valve according to the present invention.

Please refer to FIG. 5D, which illustrates another structure of the outlet valve according to the present invention. In this embodiment, the main body portion 542 is still disk-shaped, and the protrusion block 541 is an oval cone.

Figure 5E:
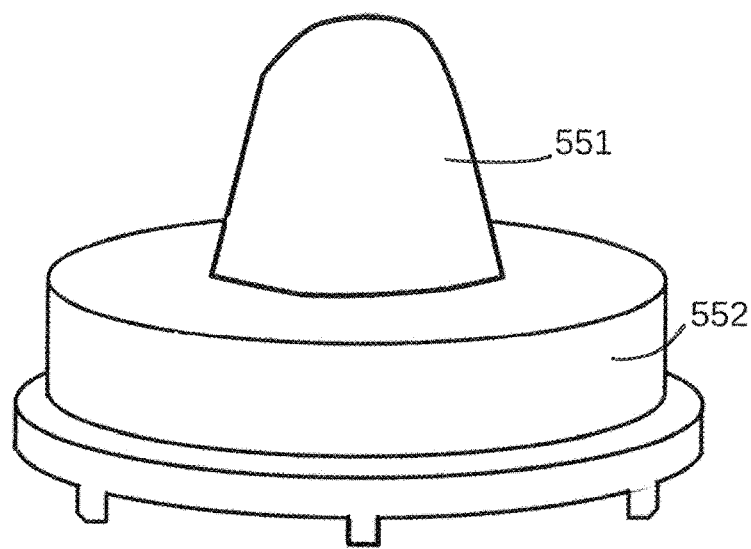
FIG. 5E illustrates another embodiment of the structure of the outlet valve according to the present invention.

Please refer to FIG. 5E, which illustrates another structure of the outlet valve according to the present invention. In this embodiment, the main body portion 552 is still a disk-shaped, and the protrusion block 551 is a cone structure.

Figure 5F:
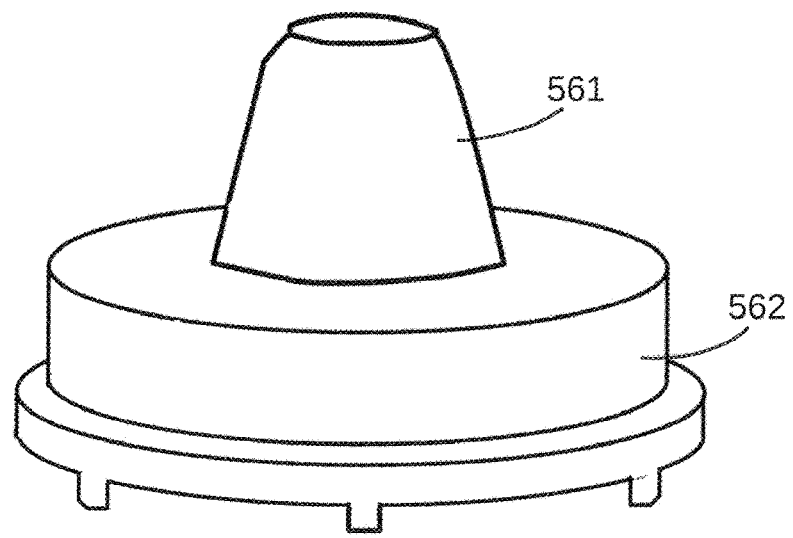
FIG. 5F illustrates another embodiment of the structure of the outlet valve according to the present invention.

Please refer to FIG. 5F, which illustrates another structure of the outlet valve according to the present invention. In this embodiment, the main body portion 562 is still disk-shaped, and the protrusion block 561 is a cone with a platform upon it.

Figure 5G:
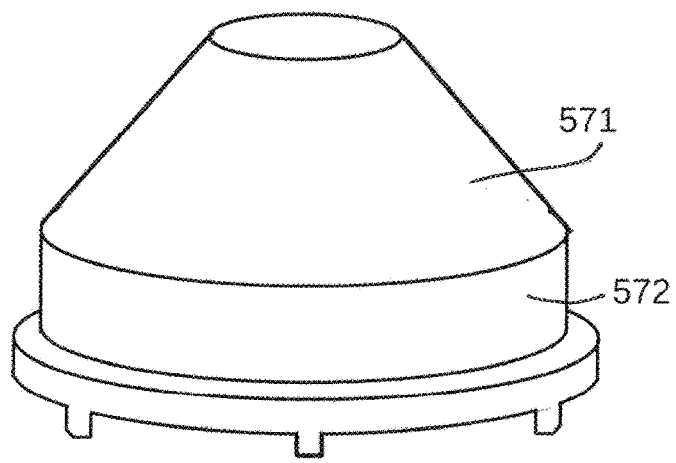
FIG. 5G illustrates another embodiment of the structure of the outlet valve according to the present invention.

Please refer to FIG. 5G, which illustrates another structure of the outlet valve according to the present invention. In this embodiment, the main body portion 572 is still disk-shaped, and the protrusion block 571 is a cone with a platform upon it, which extends upward from the main body portion 572.

Figure 5H:
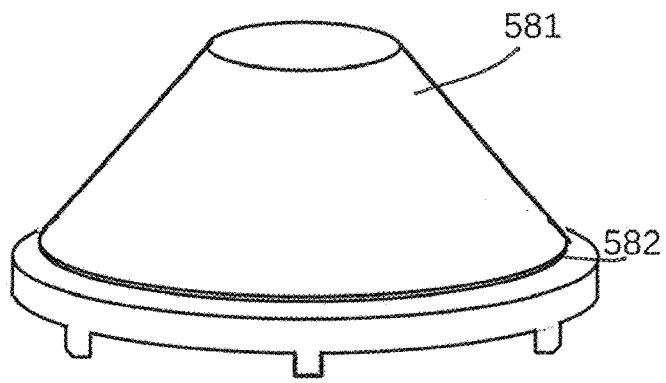
FIG. 5H illustrates another embodiment of the structure of the outlet valve according to the present invention.

Please refer to FIG. 5H, which illustrates another structure of the outlet valve according to the present invention. In this embodiment, basically the height of the main body portion 582 is 0, and the protrusion block 581 is a cone with a platform upon it, which extends upward from the main body portion 582.

Figure 5I:
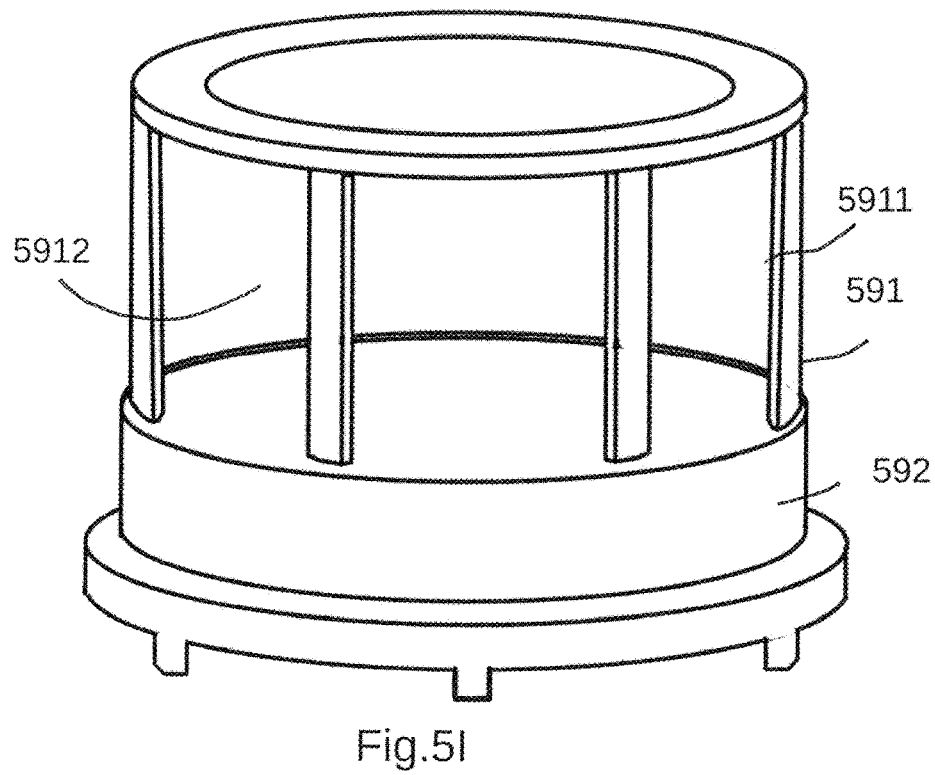
FIG. 5I illustrates another embodiment of the structure of the outlet valve according to the present invention.

Please refer to FIG. 5I, which illustrates another structure of the outlet valve according to the present invention. In this embodiment, the protrusion block 591 has a supporting blocking frame 5911. The supporting blocking frame 5911 has multiple cylinders to support a ring, and forms a space 5912 through the supporting blocking frame to keep a predetermined distance between the user and the drainage surface. Meanwhile, the supporting blocking frame 5911 keeps the water flowing through the separating space 5912 and entering the drainage surface of the main body portion 592.

Figure 5J:
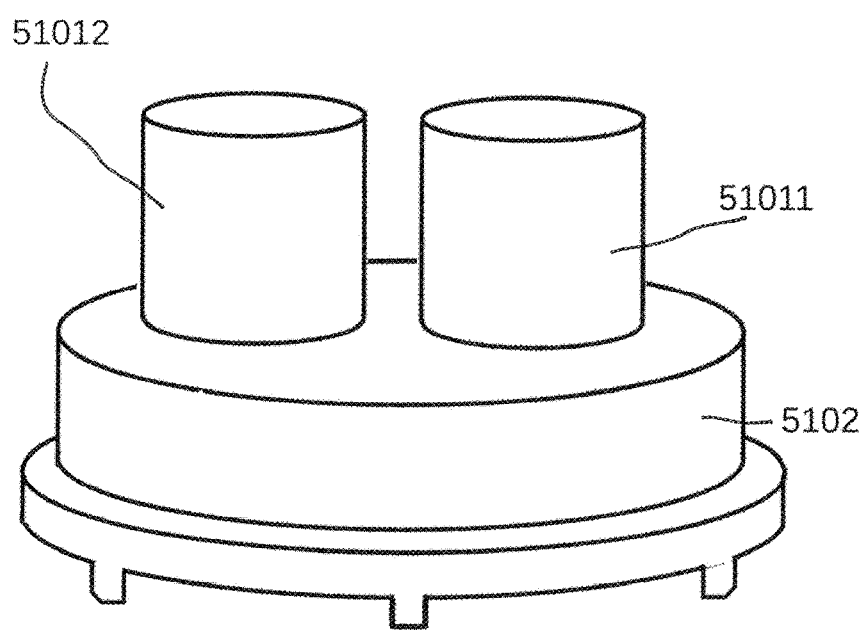
FIG. 5J illustrates another embodiment of the structure of the outlet valve according to the present invention.

Please refer to FIG. 5J, which illustrates another structure of the outlet valve according to the present invention. In this embodiment, the main body 5102 is still disk-shaped, and the protrusion block has several protrusion portions 51011, and 51012.

Figure 5K:
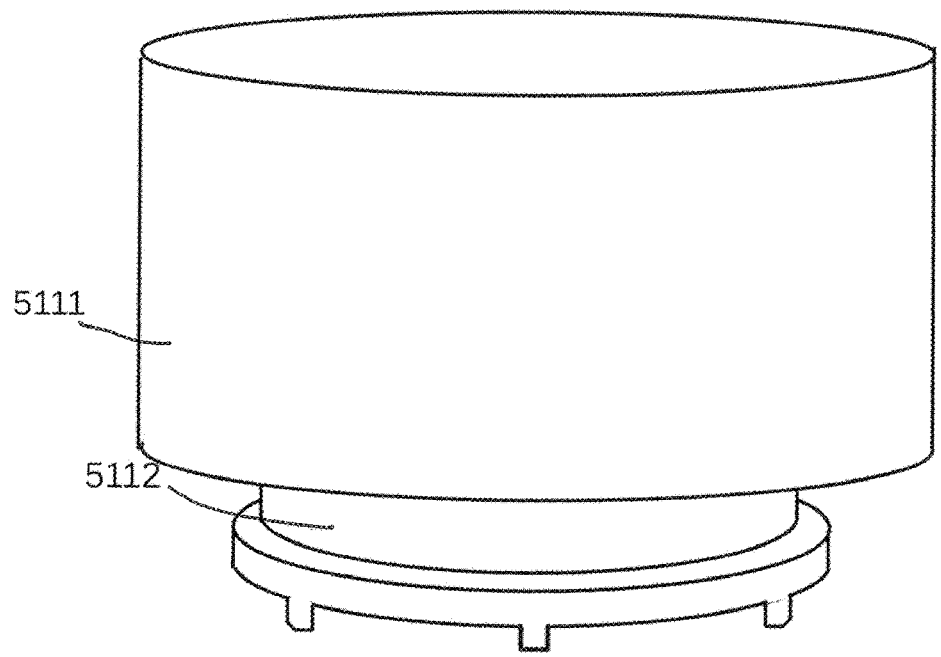
FIG. 5K illustrates another embodiment of the structure of the outlet valve according to the present invention.

Please refer to FIG. 5K, which illustrates another structure of the outlet valve according to the present invention. In this embodiment, the main body portion 5112 is still disk-shaped, and the bottom size of the protrusion block 5111 is on the upper face size of the main body portion 5112. In the embodiment, although the protrusion block 5111 covers the whole part of the main body portion 5112, under some requests, it still meets the safety if there are enough holes set on the side of the protrusive block 5111 and the side of the body 5112.

Figure 5L:
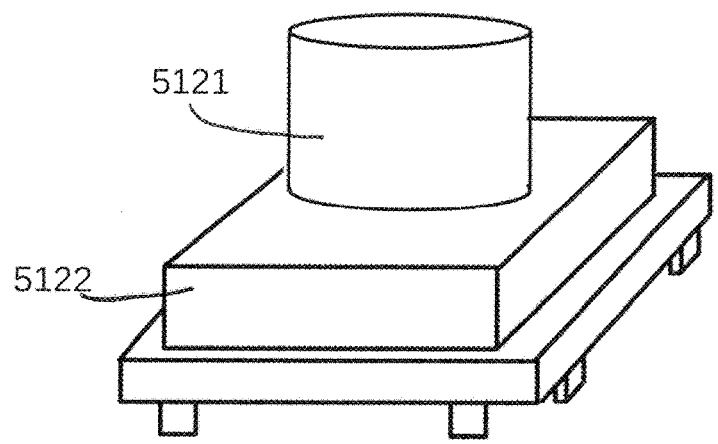
FIG. 5L illustrates another embodiment of the structure of the outlet valve according to the present invention.

Please refer to FIG. 5L, which illustrates another structure of the outlet valve according to the present invention. In the embodiment, the main body portion 5122 is multilateral-shaped, and the protrusion block 5121 remains the cylinder-shaped.

In addition to via the protrusion block, under some special circumstances such as hair stuck into the water outlet, an emergency switch may be set to switch off the filter pump or shut the drainage passage to contact the suction of drainage.

Figures 6A, 6B:
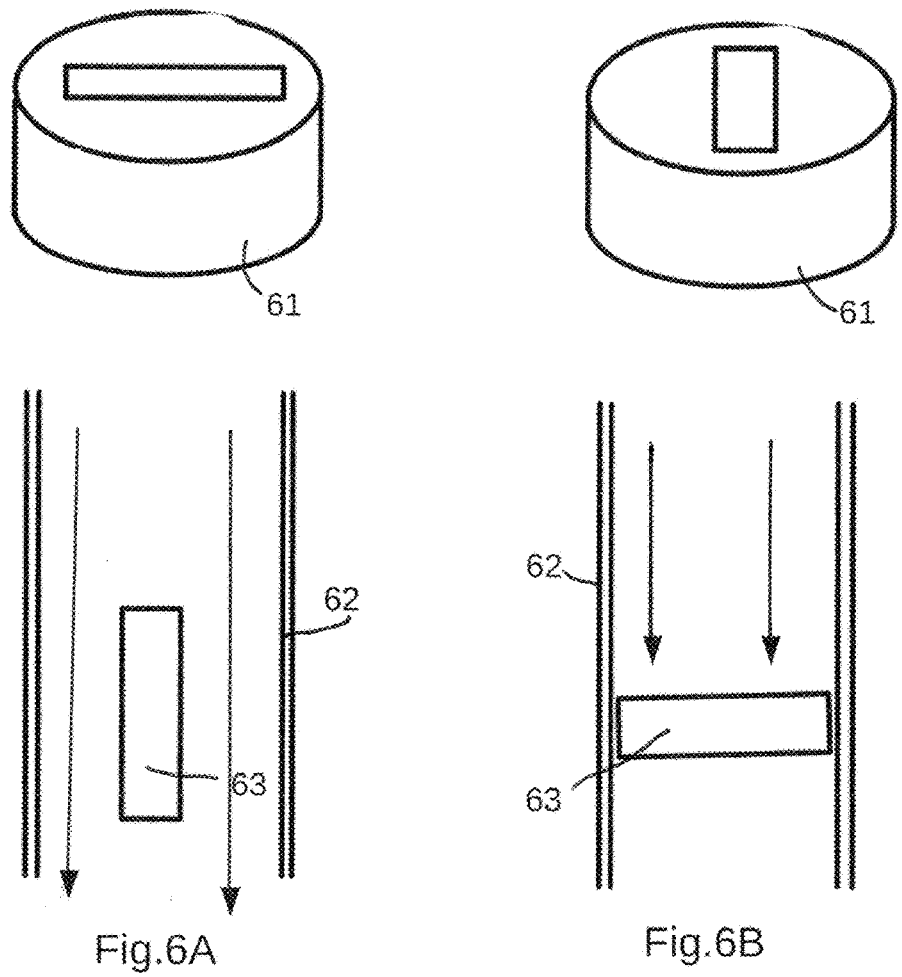
FIG. 6A and FIG. 6B illustrate the embodiment of the emergency switch.

Please refer to FIGS. 6A and 6B, which illustrate the usage of the emergency switch. In FIG. 6A, the emergency knob is set near the water outlet of the main body pool. For example, it is set where hands can easily touch and operate it when the user gets stuck. When encountering emergency, the user can operate the emergency switch 61, change the angle of the valve 63 of the drainage passage 62, shut the current and decrease the suction immediately to discharge the emergency state.

Figure 7A:
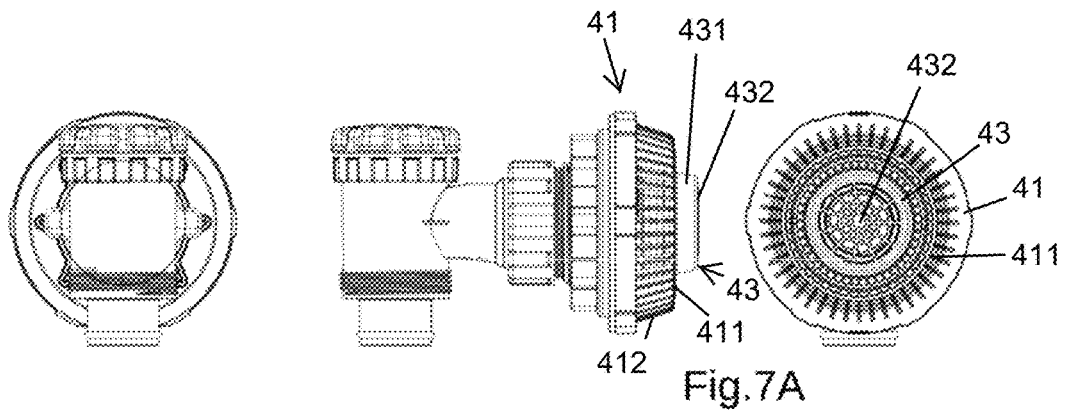
FIGS. 7A, 7B, 7C, and 7D are embodiments of an outlet valve.
Figure 7B:
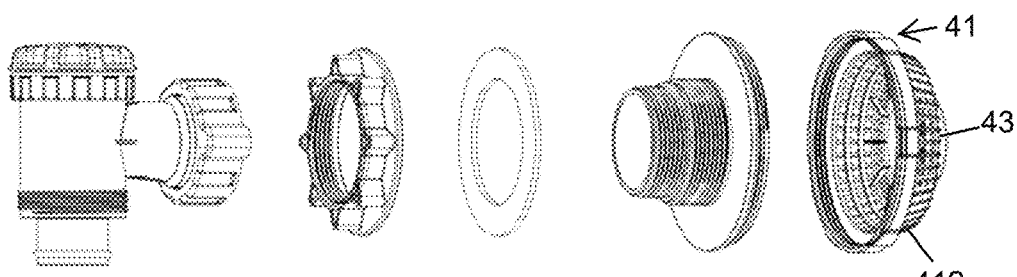
Figure 7C:
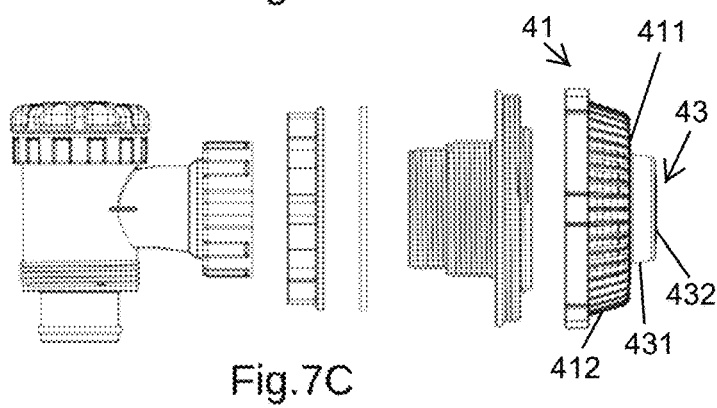
Figure 7D:
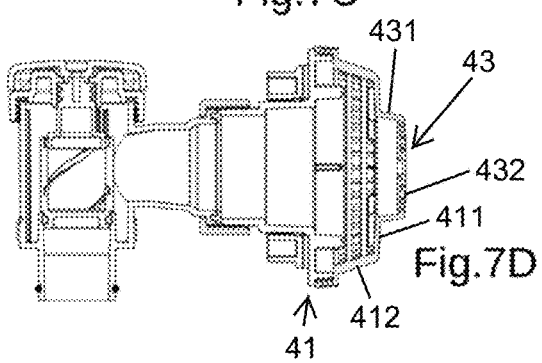

Please refer to FIGS. 7A, 7B, 7C, and 7D, which illustrate the embodiment of different angles of an outlet valve. FIG. 7A contains the front view, the first side view, and the second side view of the assembled outlet valve. FIG. 7B illustrates the schematic perspective view of the dismantled elements of the outlet valve. FIG. 7C corresponds to FIG. 7B. FIG. 7C illustrates the schematic perspective view from different angles of the dismantled elements of the outlet valve. FIG. 7D illustrates the section view of the outlet valve. From these figures, it can be known that the protrusion block of the outlet valve is directed set on the upper cover of the draining face to form an integrally formed structure.

Figure 8A:
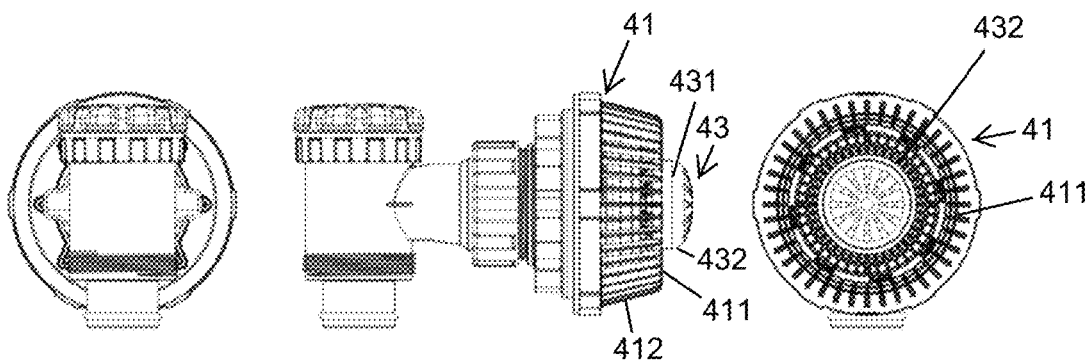
FIGS. 8A, 8B, 8C, 8D, and 8E are other embodiments of an outlet valve.
Figure 8B:
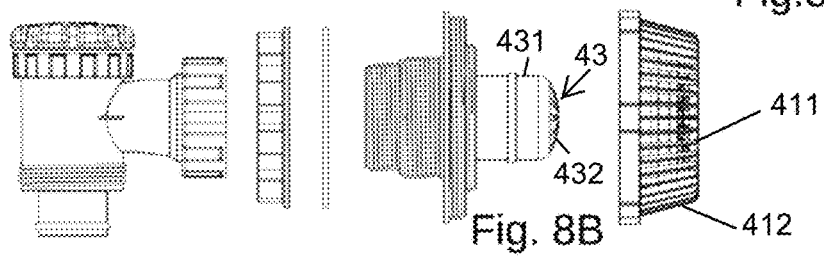
Figure 8C:
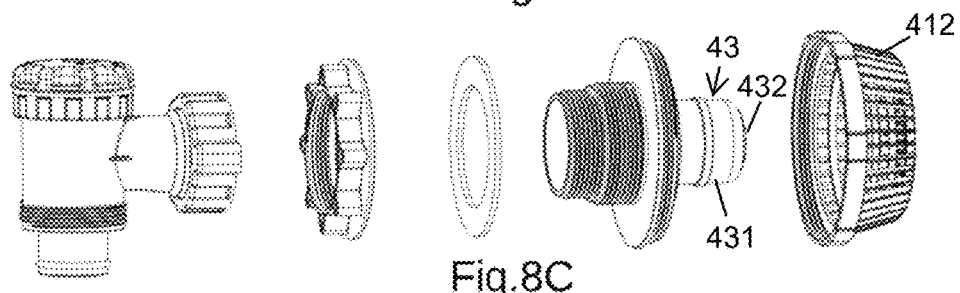
Figure 8D:
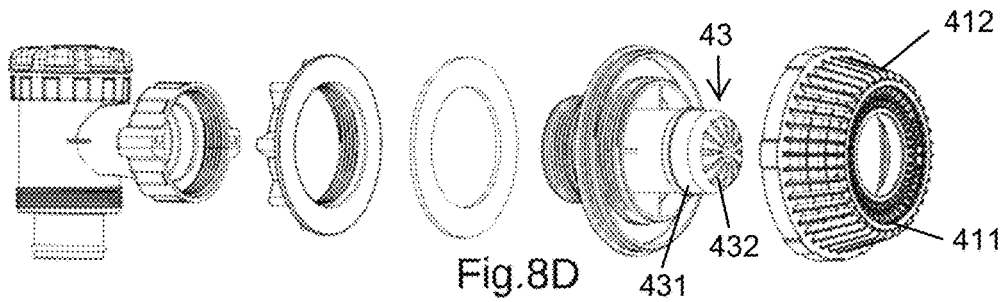
Figure 8E:
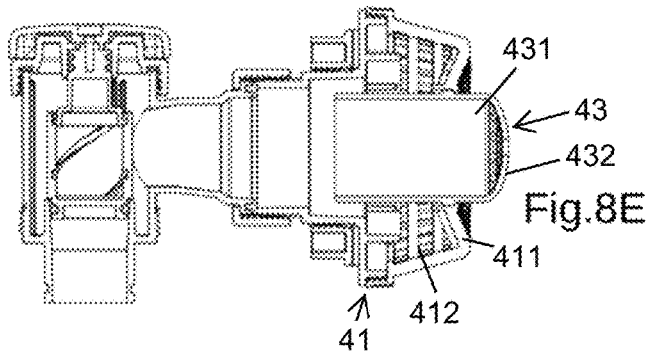

Then, please refer to FIGS. 8A, 8B, 8C, 8D, and 8E, which illustrate another embodiment of the schematic diagram from different angles of an outlet valve. FIG. 8A contains the front view, the first side view, and the second side view of the assembled outlet valve. FIGS. 8B, 8C, and 8D illustrate the schematic perspective view of elements from different angles after the outlet valve is dismantled. FIG. 8E illustrates the sectional view of the outlet valve. From these figures, it can be known that contrast to the previous embodiments, the protrusion block of the outlet valve protrudes through the holes of the drainage surface to form a protective effect.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A pool apparatus, comprising:
a pool body for holding water and for providing a user to do activities in the pool body;
a water inlet for supplying water into the pool body;
a water outlet for draining the water outside the pool body, and
an outlet valve for covering the water outlet, wherein the outlet valve has a draining surface for water flowing out of the pool body in a draining direction, and the outlet valve has a protrusion block protruding a protruding distance opposite to the draining direction from the draining surface to decrease risk of sucking the user at the water outlet.

2. The pool apparatus of claim 1, wherein the outlet valve comprises a main body portion to form the draining surface, the protrusion block is disposed on the main body portion, and a bottom side of the protrusion block overlaps with the draining surface, the main body portion comprises at least one filter screen to drain the water from the pool body, and the protrusion block has a protrusion portion protruding the protruding distance upward from the draining surface.

3. The pool apparatus of claim 2, wherein the main body portion comprises a circular structure, and the protruding distance of the protrusion block is 10% larger than the diameter of the circular structure.

4. The pool apparatus of claim 2, wherein the main body portion comprises a circular structure, and the protruding distance of the protrusion block is 5% larger than the diameter of the circular structure.

5. The pool apparatus of claim 2, wherein the main body portion comprises a circular structure, and the protruding distance of the protrusion block is 20% larger than the diameter of the circular structure.

6. The pool apparatus of claim 2, wherein the main body portion comprises a circular structure, and the circular structure has a lateral surrounding part and a circular face part, and the lateral surrounding part and the circular face part comprise a filter structure to drain water out of the pool body.

7. The pool apparatus of claim 4, wherein the protrusion portion of the protrusion block comprises a top filter screen to drain water out of the pool body.

8. The pool apparatus of claim 2, wherein the protrusion portion and the main body portion are two separable structures, and the main body portion comprises a through hole to assemble the protrusion portion.

9. The pool apparatus of claim 2, wherein the protrusion portion of the protrusion block is a dome structure.

10. The pool apparatus of claim 2, wherein the protrusion portion of the protrusion block comprises a cone-shaped body.

11. The pool apparatus of claim 2, wherein the protrusion portion of the protrusion block comprises a supporting blocking frame, and the supporting blocking frame forms a separating space to keep a predetermined distance between the user and the draining surface.

12. The pool apparatus of claim 2, wherein the protrusion block comprises multiple protrusion portions.

13. The pool apparatus of claim 2, wherein the area of the bottom side of the protrusion block is larger than the area of the draining surface.

14. The pool apparatus of claim 2, wherein the main body portion is a polygonal structure.

15. The pool apparatus of claim 2, wherein the main body portion and the protrusion block have different geometric shapes.

16. The pool apparatus of claim 1, further comprising a filter pump linked to the water inlet and the water outlet of the pool body for providing a draining power to drain water out of the outlet from the pool body, wherein there is a predetermined correspondence between the protrusive distance and the draining power.

17. The pool apparatus of claim 16, wherein the draining power is larger than 1,000 gallons/hr.

18. The pool apparatus of claim 16, wherein the draining power is larger than 2000 gallons/hr.

19. The pool apparatus of claim 1, further comprising an emergency switch to turn off a filter pump used for drainage.

20. The pool apparatus of claim 19, wherein the emergency switch is set close to the outlet valve.

* * * * *